United States Patent [19]
Abe

[11] Patent Number: 5,081,618
[45] Date of Patent: Jan. 14, 1992

[54] DOUBLE-SIDED REPRODUCING DISK PLAYER

[75] Inventor: Kaname Abe, Saitama, Japan

[73] Assignee: Pioneer Electronic Corporation, Tokyo, Japan

[21] Appl. No.: 468,414

[22] Filed: Jan. 22, 1990

[30] Foreign Application Priority Data

Mar. 6, 1989 [JP] Japan .................................. 1-52123

[51] Int. Cl.⁵ .................. G11B 17/02; G11B 17/028
[52] U.S. Cl. ................................ 369/244; 369/195; 369/199; 369/77.1
[58] Field of Search .............. 369/195, 199, 77.1, 369/244

[56] References Cited

U.S. PATENT DOCUMENTS

| | | |
|---|---|---|
| 4,634,853 | 1/1987 | Kanamaru . |
| 4,669,076 | 5/1987 | Broom .................... 369/77.1 |
| 4,829,508 | 5/1989 | Arita ........................ 369/244 |
| 4,839,881 | 6/1989 | Takahara ................ 369/77.1 |
| 4,903,140 | 2/1990 | Okamoto ................ 369/199 |
| 4,922,477 | 5/1990 | Miura ...................... 369/244 |

FOREIGN PATENT DOCUMENTS

| | | | |
|---|---|---|---|
| 0287476 | 12/1987 | Japan .................... | 369/244 |
| 0078383 | 4/1988 | Japan .................... | 369/244 |
| 0094471 | 4/1988 | Japan .................... | 369/244 |
| 0300489 | 12/1988 | Japan .................... | 369/244 |
| 0302479 | 12/1988 | Japan .................... | 369/244 |

Primary Examiner—Stuart S. Levy
Assistant Examiner—John Pokotylo
Attorney, Agent, or Firm—Sughrue, Mion, Zinn Macpeak & Seas

[57] ABSTRACT

A double-sided reproducing disk player wherein reduction in size and simplification in structure of a carriage can be attained and reduction in number of parts and simplification in construction of the entire arrangement can be attained to attain reduction in overall size and also in production cost. The player comprises upper and lower face guide mechanisms for guiding a carriage, on which an optical pickup is carried, along upper and lower surfaces of a disk, respectively. The upper and lower face guide mechanisms are carried on a carrying device which is supported for tilting motion on a stationary frame of the player, and the tilt angle of the carrying device with respect to the stationary frame is adjusted by a tilt angle adjusting device. The tilt angle adjusting device includes an eccentric member on the stationary frame and a spring for biasing the carrying device into cooperation with the eccentric member. The eccentric member is rotated by a motor in response to a tilt angle of the carrying device detected by a tile angle detecting sensor.

9 Claims, 7 Drawing Sheets

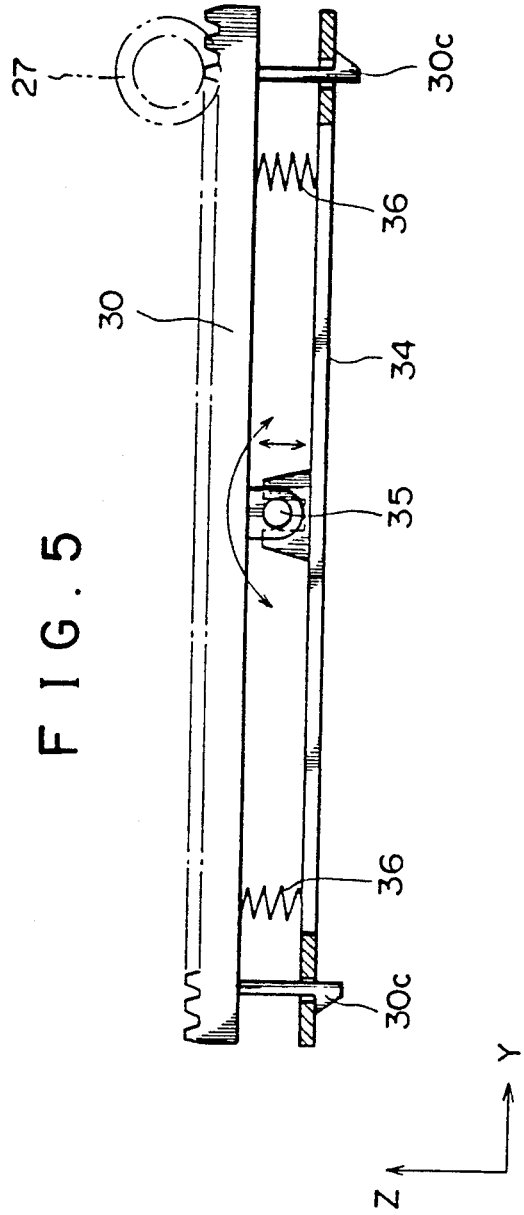
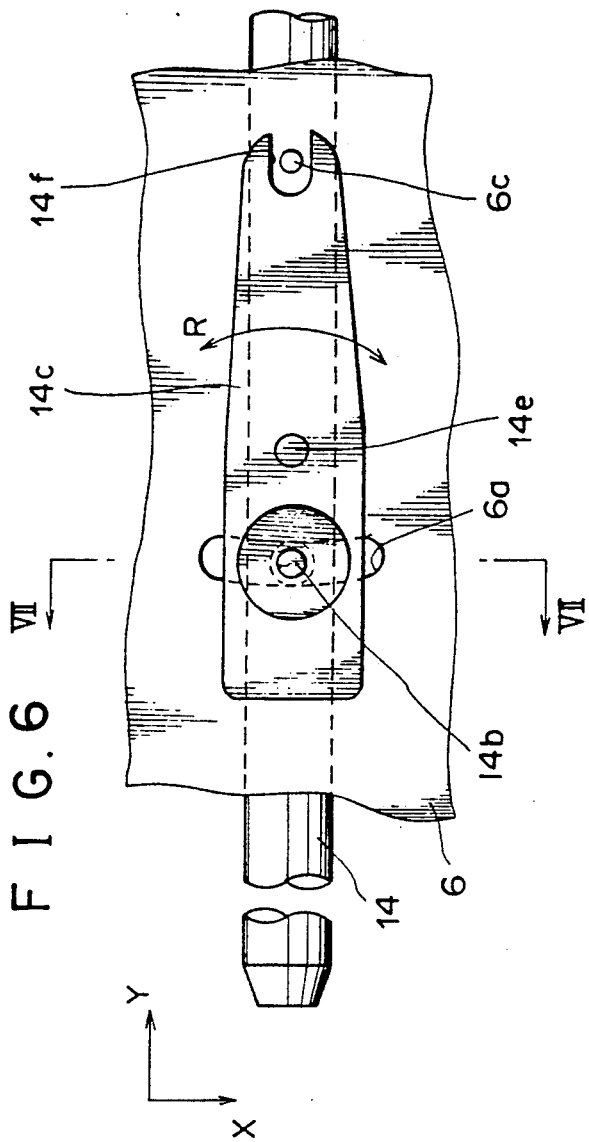
FIG. 5
FIG. 6

F I G. 7
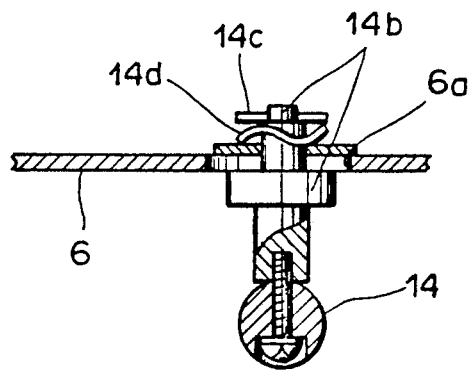
F I G. 8
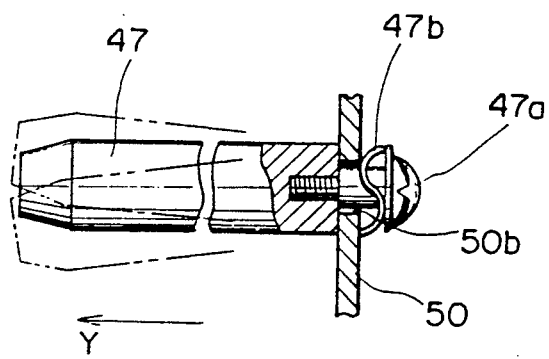
F I G. 9A
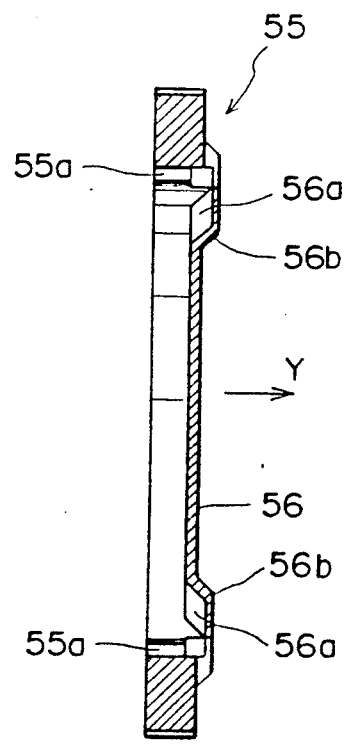
F I G. 9B
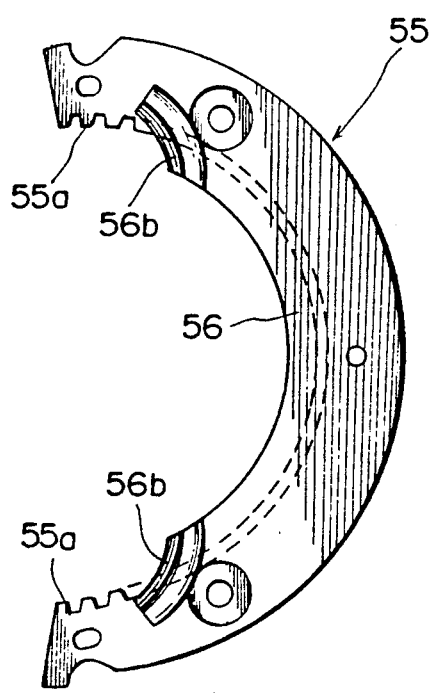

DOUBLE-SIDED REPRODUCING DISK PLAYER

BACKGROUND OF THE INVENTION

1. Field of the Invention

This invention relates to improvements in or relating to a double-sided reproducing disk player on which signals of a double-sided disk such as a video disk which is formed by sticking a pair of optical disks, each having a signal record layer formed thereon together such that the signal record layers may be exposed on the opposite surfaces of the double-sided disk can be read by means of a pickup without turning over the disk.

2. Description of the Prior Art

In a conventional double-sided reproducing optical disk player of the type mentioned, a carriage having thereon an optical pickup for reading a signal is moved along a lower face of an optical disk under the guidance of a lower face guiding means in order to read a signal from a signal record face on the lower surface of the disk.

After completion of such reading of signals on the lower surface of the disk, the carriage is turned over by a turnover means and transferred from the lower face guiding means to an upper face guiding means.

Then, the carriage is guided along an upper surface of the disk by the upper face guiding means while the pickup reads a signal from a signal record face of the upper surface of the disk, thereby achieving reproduction of signals from the two surfaces of the disk.

In order for the optical pickup to read a signal of the optical disk, however, the distance between an objective lens of the pickup and a surface of the disk must be maintained fixed so that the pickup may be focused upon a signal record layer of the disk.

Besides, since the pickup reads a signal of a signal record face of the disk with reflected light from the signal record face, the optical axis of the pickup must be perpendicular to the plane of the signal record face of the disk.

Such requirements must be satisfied whether or not the disk is curved or bent. Otherwise, a signal of the disk cannot be reproduced regularly.

In a conventional double-sided reproducing disk player, a correcting means for correcting the distance and angle of a pickup with respect to a disk so as to satisfy the requirements described above is provided in a carriage.

Consequently, the conventional double-sided reproducing disk player is disadvantageous in that the carriage is comparatively great in size and complicated in structure, which hinders miniaturization of the player.

Also, a servo circuit for correcting the distance and angle of a pickup with respect to a disk is complicated and has a comparatively great number of parts. Accordingly, the conventional double-sided reproducing disk player is also disadvantageous because its production cost cannot be reduced.

SUMMARY OF THE INVENTION

It is an object of the present invention to provide a double-sided reproducing disk player wherein reduction in size and simplification in structure of a carriage can be attained and reduction in number of parts and simplification in construction of the entire arrangement can be attained to attain reduction in overall size and also in production cost.

In order to attain the object, according to the present invention, there is provided a double-sided reproducing disk player which comprises a stationary frame, means on the stationary frame for receiving and driving a disk to rotate around an axis of the disk a carriage having thereon an optical pickup for optically reading a signal of the disk, an upper face guide means for guiding the carriage along an upper surface of the disk, a lower face guide means for guiding the carriage along a lower surface of the disk, a transport means for transporting the carriage from the upper face guide means to the lower face guide means or vice versa, a carrying means on which the upper and lower face guide means and transport means are carried, a driving means for moving the carriage along the upper or lower face guide means, a support means for supporting the carrying means for tilting motion around a fixed axis on the stationary frame, and a tilt angle adjusting means for adjusting a tilt angle of the carrying means with respect to the stationary frame. The fixed axis for the carrying means may lie in a plane perpendicular to the plane of the disk and also to a passage of the carriage along the upper or lower guide means.

With the double-sided reproducing disk player, the carriage having thereon the optical pickup for reading a signal of a disk can be transported from the side of one surface to the side of the other surface of the disk and then moved under the guidance of the upper or lower face guide means to read signals of the disk with the optical pickup, thereby reproducing the opposite record faces of the disk.

The tilt angle of the carrying means may be adjusted such that the optical axis of the optical pickup of the carriage may make the right angle with respect to the plane of the disk. Such adjustment may be performed in response to a detection signal of a tilt angle of the carrying means obtained from an inclination angle detecting sensor which may be provided in the carriage.

Preferably, at least one of the upper and lower face guide means is mounted for adjustment with respect to the carrying means and hence to the other of the upper and lower face guide means. When the upper and lower face guide means are positioned accurately relative to each other on the carrying means, whether the carriage is positioned on the side of the upper surface of the disk or on the side of the lower surface of the disk, the tilt angle of the carrying means can be adjusted such that the optical axis of the optical pickup may make the right angle with respect to the plane of the disk.

Preferably, the tilt angle adjusting means is mounted on the stationary frame for cooperation with the carrying means. Consequently, the carriage can be reduced in overall size and weight and simplified in construction, and accordingly, the player can be reduced in overall size. Such tilt angle adjusting means may be constituted from an eccentric element mounted on the stationary frame for angular rotation around another fixed axis parallel to the fixed axis for the carrying means, and a spring means for resiliently biasing the carrying means into cooperation with the eccentric element. The tilt angle adjusting means may further include a motor mounted on the stationary frame and connected to rotate the eccentric element. Since the tilt angle adjusting means can be constructed from such a simple mechanism, reduction in number of parts and also in production cost can be attained.

When the position of the support means on which the carrying means is supported is selected suitably, the distance from an objective lens of the pickup to a face of the disk can be fixed. Consequently, a mechanism which is otherwise required for fixing such distance can be eliminated.

The above and other objects, features and advantages of the present invention will become apparent from the following description and the appended claims, taken in conjunction with the accompanying drawings.

BRIEF DESCRIPTION OF THE DRAWINGS

FIG. 5 is a side elevational view of a mechanism for horizontally holding a rack member;

FIG. 6 is a plan view of a supporting mechanism for a first guide member;

FIG. 7 is a sectional view taken along line VII—VII of FIG. 6;

FIG. 8 is a side elevational view of the holding member of FIG. 5 in a tilted condition;

FIGS. 9A and 9B are a front elevational view and a cross sectional view, respectively, of a sun gear;

DESCRIPTION OF THE PREFERRED EMBODIMENT

Referring first to FIGS. 1 to 4, there is shown a double-sided reproducing disk player of a preferred embodiment of the present invention. The double-sided reproducing disk player shown includes a lower chassis 5 and an upper chassis 6 disposed in a player housing not shown. The lower chassis 5 and the upper chassis 6 are connected to each other by, for example, three leg members 1, 2 and 3. It is to be noted that, in any figure, an arrow Y indicates the forward direction of the double-sided reproducing disk player, another arrow X indicates the leftward direction, and a further arrow Z indicates the upward direction.

Figure 2:
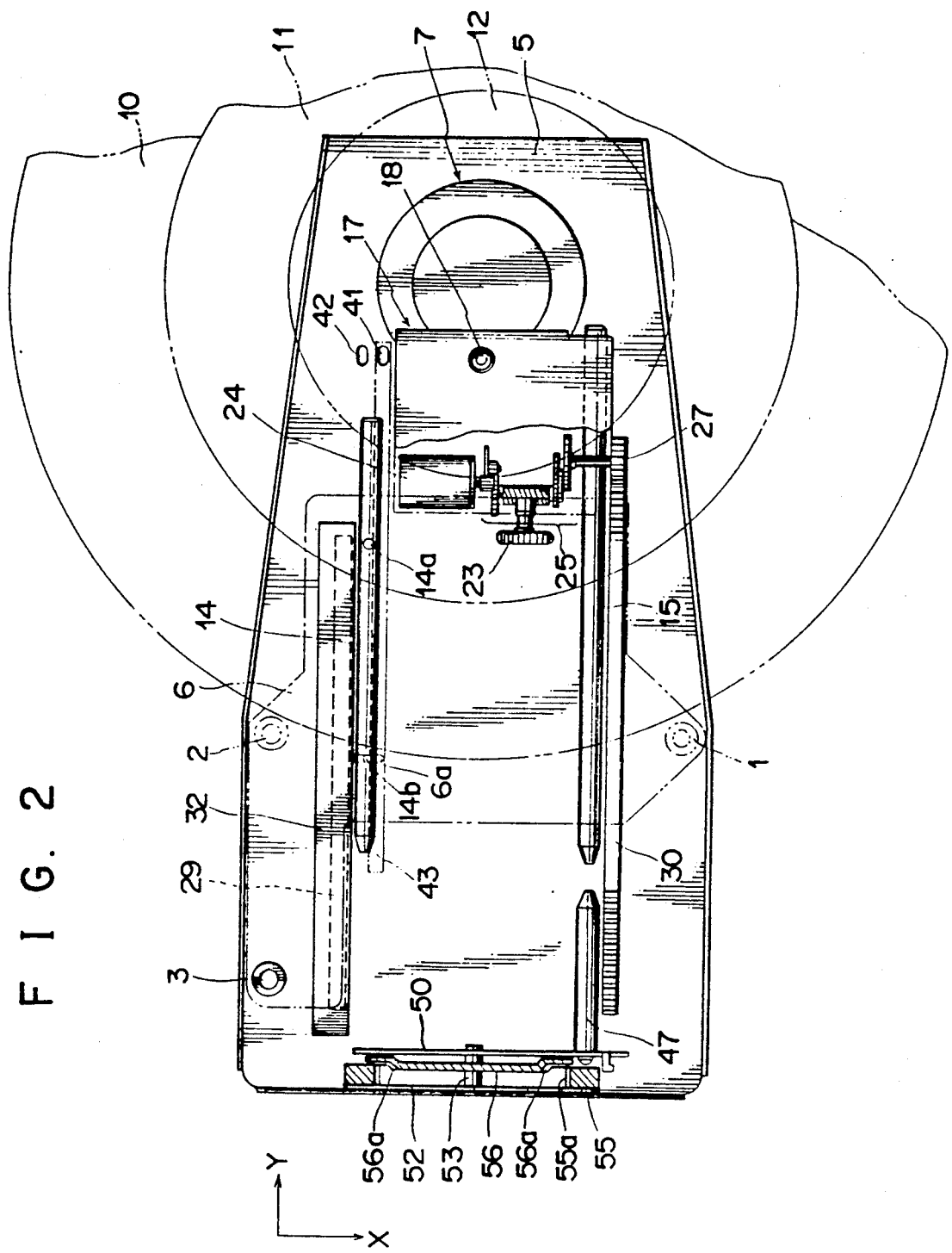
FIG. 2 is a plan view, partly in section, of the double-sided reproducing disk player of FIG. 1.
Figure 3:
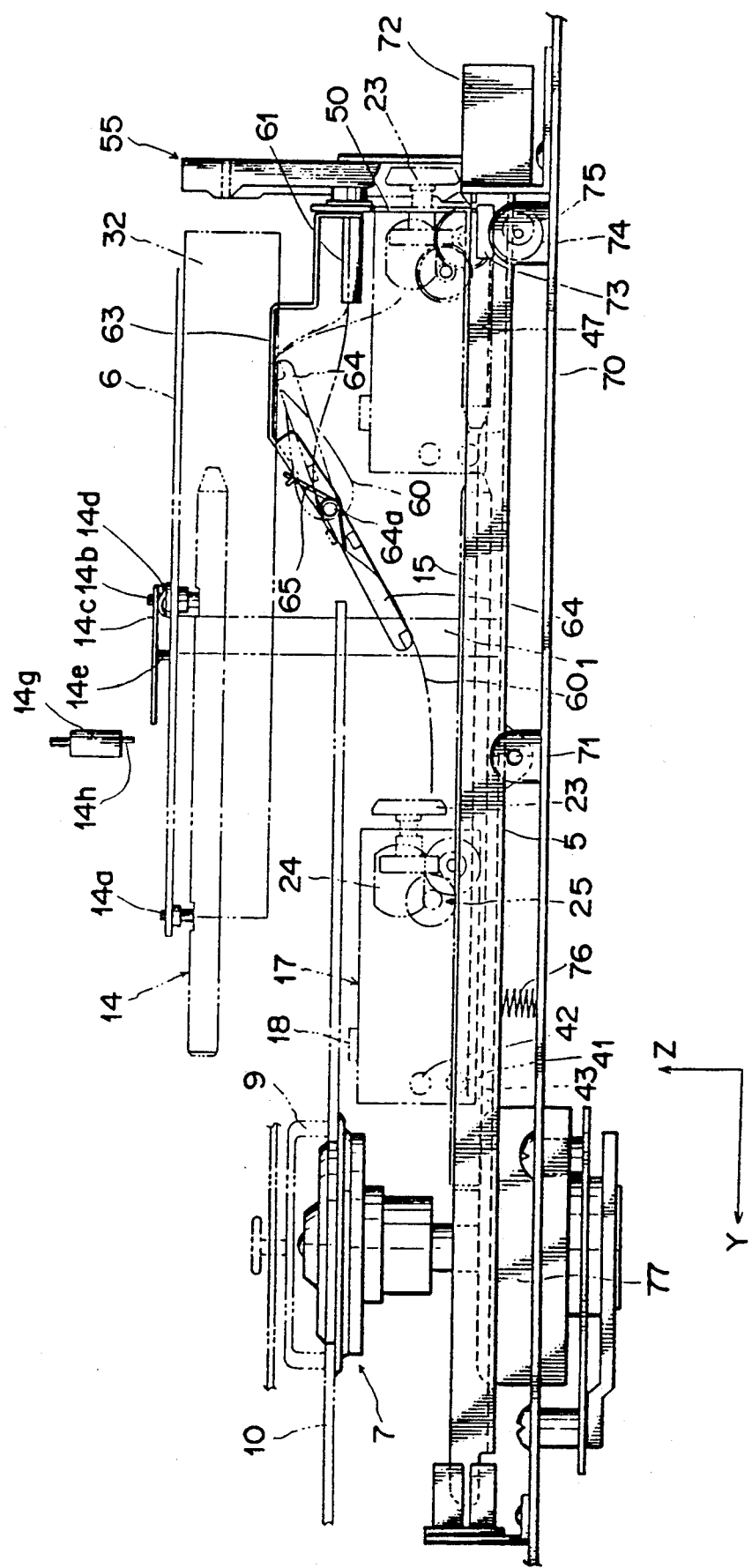
FIG. 3 is a right-hand side elevational view of the double-sided reproducing disk player of FIG. 1.

As particularly seen in FIG. 3, a spindle motor 77 having a turntable 7 thereon is provided on a main chassis 70, and a disk 10 is clamped on the turntable 7 by means of a clamper 9. The disk 10 shown in FIGS. 1, 3 and 4 has a diameter of about 30 cm and is composed of a pair of circular base plates each having a signal record layer thereon and coupled to each other such that the record layers thereof may be disposed on the inner sides of the disk 10. It is to be noted that, as seen in FIG. 2, another disk 11 having a diameter of about 20 cm and a further disk 12 having a diameter of about 12 cm can also be played on the disk player. The turntable 7 has a centering member for engaging with a center hole of a disk of any diameter to achieve centering of the disk.

A first movable cylindrical guide member 14 and a second fixed cylindrical guide member 15 are mounted as a pair on the upper chassis 6 and the lower chassis 5, respectively, and extend in parallel to each other and also to record faces of the disk 10 in directions parallel to the direction of the arrow mark Y such that they may be located above and below the disk 10, respectively. A carriage 17 is provided for engagement with the first or second guide members 14 and 15 depending on the signal record surface of the disk being reproduced. The carriage 17 carries thereon an optical pickup which includes an optical system including an objective lens 18 and a servo driving mechanism not shown for servo driving the objective lens 18 in two directions including a direction of the optical axis of the objective lens 18, that is, a focusing direction, and another direction perpendicular to the focusing direction, that is, a tracking direction.

It is to be noted that the optical pickup projects irradiation light to a record face of the disk 10 and reads record information from a change of the reflected light.

A planetary gear 23 is provided at a rear end portion of the carriage 17 and connected to be driven to rotate by a motor 24 carried on the carriage 17 by way of a gear mechanism 25. It is to be noted that the motor 24 and the gear mechanism 25 are omitted in FIG. 1. Another gear 27 is provided at a left end portion of the carriage 17 and also connected to be driven to rotate by the motor 24 by way of the gear mechanism 25. A pair of rack members 29 and 30 are disposed in parallel to the first and second guide members 14 and 15 such that they may be located above and below the disk 10, respectively. The gear 27 mentioned above is disposed for meshing engagement with the rack members 29 and 30.

Figure 1:
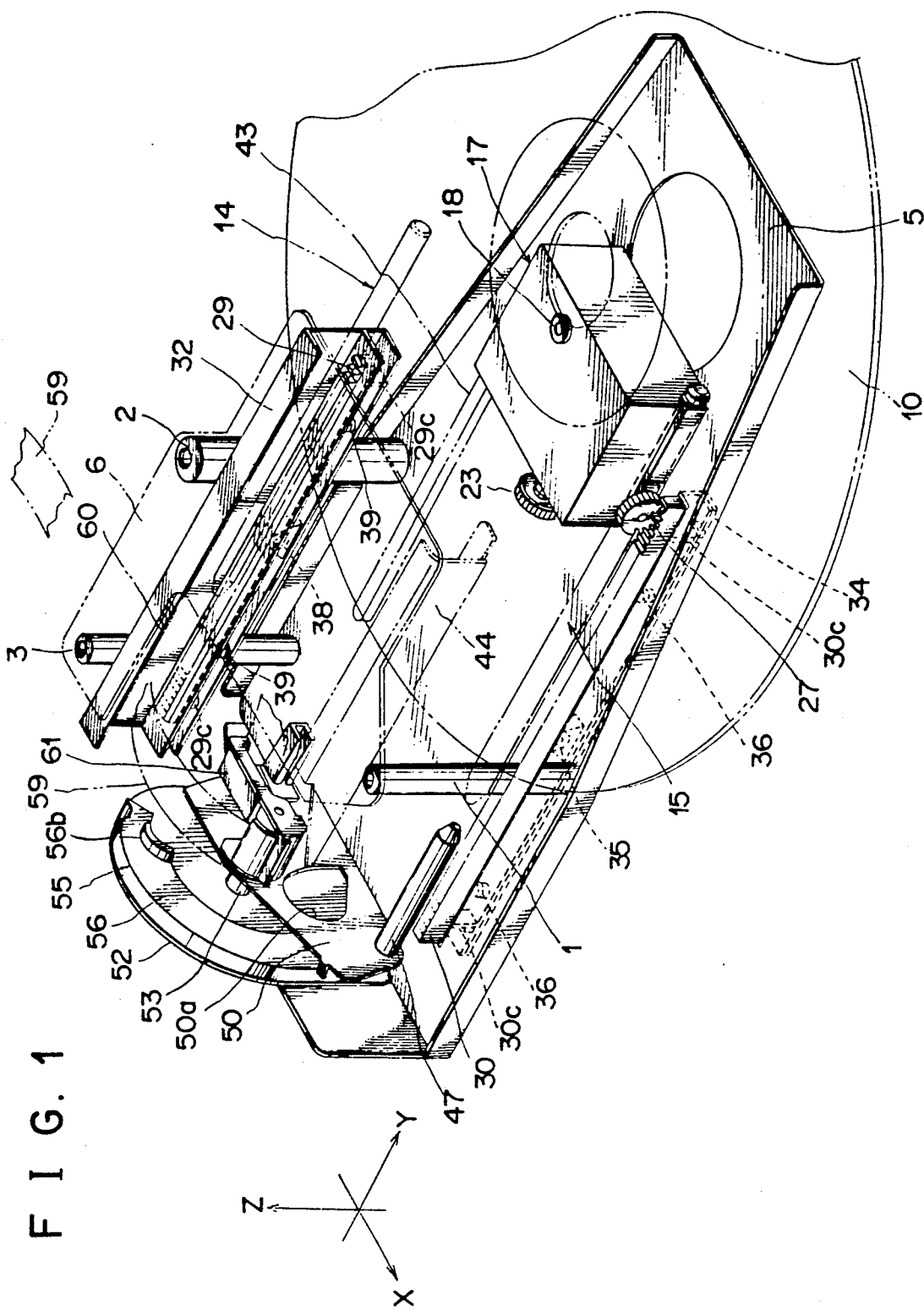
FIG. 1 is a perspective view of a double-sided reproducing disk player with a player housing omitted showing a preferred embodiment of the present invention.

Referring to FIGS. 1, 2 and 5, the left-hand side rack member 30 is mounted for rocking motion at a substantially central portion thereof on a bracket 34 by means of a pin 35 such that a free end portion thereof can be moved toward and away from the gear 27 in a direction perpendicular to the direction of movement of the optical pickup. The bracket 34 is securely mounted on the lower chassis 5. A pair of pawl members 30c are formed on a lower face of the rack member 30 near the opposite end portions and are normally held in arresting engagement with the bracket 34 to restrict the rocking motion of the rack member 30 within a predetermined range. As particularly seen from FIG. 5, a pair of front and rear coil springs 36 are provided as a biasing force exerting means for biasing the rack member 30 to pivot to move the free end portion thereof toward the gear 27.

Figure 4:
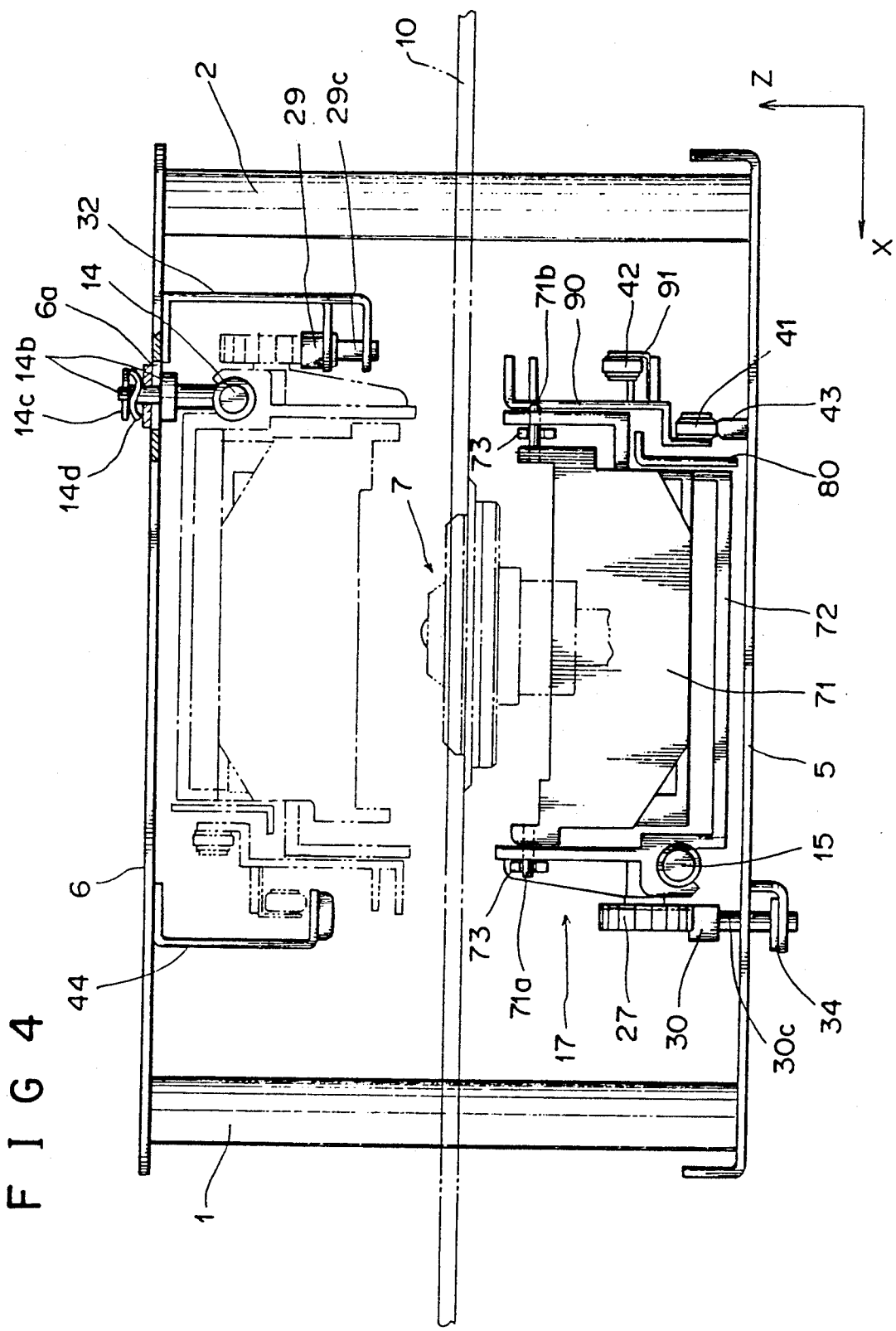
FIG. 4 is a front elevational view of the double-sided reproducing disk player of FIG. 1.

Referring now to FIGS. 1 and 4, also the right-hand side rack member 29 is mounted for rocking motion in a plane perpendicular to the direction of movement of the optical pickup on a bracket 32 by means of a pin 38 similarly to the left-hand side rack member 30. The rack member 29 has a pair of pawl members 29c for engaging with the bracket 32 to restrict the range of rocking motion of the rack member 29 and is normally biased to pivot to move a free end portion thereof toward the gear 27 by a pair of coil springs 39 which serve as a biasing force exerting means.

Referring to FIGS. 2 to 4, the carriage 17 has a pair of rollers 41 and 42 provided in a spaced relationship in a vertical direction, that is, in the direction of the arrow Z at the right end portion thereof. The rollers 41 and 42 serve as engaging elements. The lower roller 41 is disposed for rolling movement on a linear guide projection 43 formed on the lower chassis 5 in parallel to the second guide member 15 while the upper roller 42 is disposed for rolling movement on a guide rail 44 serving as a movable guide member mounted on the upper chassis 6 in parallel to the first guide member 14. In other words, the linear guide projection 43 provided on the lower chassis 5 acts as a fixed guide member for the roller 41. The first guide member 14 and the guide rail 44 form a first passage for guiding the carriage 17 along the upper record face of the disk 10 and will be hereinafter referred to generally as a first guide mechanism. Meanwhile, the second guide member 15 and the linear guide projection 43 of the lower chassis 5 form a second passage for guiding the carriage 17 along the lower record face of the disk 10 and will be hereinafter referred to generally as a second guide mechanism.

Each of the first and second guide members 14 and 15 has a rear end formed into a peaked or conical shape so that the carriage 17 can be engaged readily with the guide member 14 or 15 at the peaked rear end. A holding member 47 in the form of a peaked shaft is disposed behind the guide member 14 or 15 such that it may be engaged with the carriage 17, which has been disengaged from the guide member 14 or 15, to hold the carriage 17 thereon. Though not shown, another means is provided for preventing the carriage 17 from coming off from the holding members 47 and thus constitutes a carrying member for carrying the carriage 17 thereon together with the holding members 47.

Referring to FIGS. 2, 4, 6 and 7, the first guide member 14 serving as a movable guide member is mounted on the upper chassis 6 serving as a fixed supporting member by way of a pair of support shafts 14a and 14b. The support shaft 14a for supporting the forward end of the first guide member 14 is mounted either in a fixed relationship or for turning motion on the upper chassis 6 such that the first guide member 14 may be pivoted around the support shaft 14a. The support shaft 14a extends in parallel to the axis of rotation of the turntable 7, and accordingly, the first guide member 14 is pivoted in a plane perpendicular to the axis of rotation of the turntable 7. The other support shaft 14b for mounting the rear end portion of the first guide member 14 on the upper chassis 6 extends in the leftward and rightward direction, that is, in the direction of the arrow X on the upper chassis 6 and is preferably fitted in an elongated hole 6a which is formed in the upper chassis 6 with a curvature with respect to the support shaft 14a. As particularly seen from FIGS. 6 and 7, a longitudinal adjusting member 14c is coupled to an upper end of the support shaft 14b by, for example, caulking, and a spring washer 14d is interposed between the longitudinal adjusting member 14c and the upper chassis 6 and acts to press a free or rear end portion of the first guide member 14 against the upper chassis 6. The spring washer 14d serves as a frictional force exerting means for exerting a frictional force between the free end portion of the first guide member 14 and the upper chassis 6. The first guide member 14 is thus secured to the upper chassis 6 under such frictional force.

Referring to FIGS. 3 and 6, the longitudinal adjusting member 14c which cooperates with the upper chassis 6 to hold the spring washer 14d therebetween extends substantially in parallel to the first guide member 14 and is mounted at a mid portion thereof for rocking motion in a plane parallel to the plane of pivotal motion of the first guide member 14 on the upper chassis 6 by means of a pin 14e. The longitudinal adjusting member 14c is connected at a rear end portion thereof to the first guide member 14 by way of the support shaft 14b. As shown in FIG. 6, a U-shaped recess 14f is formed at a front end portion of the longitudinal adjusting member 14c, and a small circular recess 6c is formed at a location of the upper chassis 6 corresponding to the U-shaped recess 14f. An eccentric driver 14g shown in FIG. 3 is disposed for insertion into the recess 14f of the longitudinal adjusting member 14c while an acting element 14h is provided at an end of the eccentric driver 14g for fitting into the circular recess 6c of the upper chassis 6. Thus, if the eccentric driver 14g is turned around its axis, then the longitudinal adjusting member 14c is rocked around the pin 14e so that the first guide member 14 is pivoted against the frictional force exerted by the spring washer 14d around the center provided by the support shaft 14a on which the first guide member 14 is supported for rotation. In other words, the position of the guide passage of the first guide mechanism including the first guide member 14 can be adjusted in a plane perpendicular to the axis of rotation of the turntable 7 shown in FIGS. 3 and 4. With the construction, an extension line of a locus of movement of the optical axis of irradiation light when the optical pickup moves along a record face of the disk and the axis of rotation of the disk can be made to intersect each other with respect to both surfaces of the disk. In particular, upon assembly of the disk player, the turntable 7 is set for movement such that the position of the axis of rotation thereof may be moved, and the relative positions of the turntable 7 and the second guide mechanism for guiding the carriage 17 for movement along a B surface (a lower surface, for example) of the disk are set by moving the turntable 7 such that the axis of rotation of the turntable 7 may be positioned on an extension line of a locus of movement of the optical axis of irradiation light projected toward the B surface of the disk, whereafter the longitudinal adjusting member 14c is rocked by means of the eccentric driver 14g to perform adjustment of the position of the guide passage of the first guide mechanism so that an extension line of a locus of movement of the optical axis of irradiation light projected toward the other A surface of the disk may intersect the axis of rotation of the turntable 7. Since a substantially perpendicularly intersecting condition between an extension line of a locus of movement of the optical axis of irradiation light and the axis of rotation of the disk can be attained with respect to the opposite surfaces of the disk in this manner, a reproduction signal can be obtained always in a stabilized condition from the opposite surfaces of the disk.

Referring to FIGS. 1 to 3 and 8, the holding member 47 for engaging with and supporting thereon the carriage 17 transferred from the first or second guide mechanism described hereinabove is mounted on and extends forwardly in the direction of the arrow Y from a turning member 50 in the form of a plane. The turning member 50 is supported for turning motion on a mounting plate 52 by means of a support shaft 53 implanted on and extending forwardly in the direction of the arrow Y from the mounting plate 52. The mounting plate 52 is securely mounted on a rear end portion of the lower chassis 5. Meanwhile, a semicircular internal sun gear 55 is mounted on the mounting plate 52 in a coaxial relationship to an axis of turning motion of the turning member 50. Details of the sun gear 55 are shown in FIGS. 9A and 9B. It is to be noted that the turning member 50 is disposed for turning motion in a plane which intersects, at a right angle in this instance, the direction in which the carriage 17 is guided by the first guide mechanism or the second guide mechanism described hereinabove. The planetary gear 23 is provided on the carriage 17 for meshing engagement with a toothed portion 55a of the sun gear 55. In this instance, the planetary gear 23 meshes with the sun gear 55 while extending through a hole 50a shown in FIG. 1 formed in the turning member 50. A disengagement preventing member 56 in the form of a flange is provided in an integrated relationship on an inner periphery of the sun gear 55 for slidably contacting with a front end face of the planetary gear 23 to prevent the planetary gear 23 from being brought out of engagement with the sun gear 55.

The disengagement preventing member 56 is provided over a predetermined angular range around the axis of rotation of the sun gear 55. As particularly seen in FIGS. 9A and 9B, a pair of tapered faces 56a are formed at the opposite end portions of the disengagement preventing member 56 such that they may be inclined toward the toothed portion 55a of the sun gear 55. Accordingly, each of the portions of the disengagement preventing member 56 on which the tapered faces 56a are formed makes a projection 56b which projects forwardly in the direction indicated by the arrow mark Y with respect to the remaining portion of the disengagement preventing member 56. The planetary gear 23 which is brought into meshing engagement with the toothed portion 55a of the sun gear 55 while being rotated around its own axis then starts its rolling movement or revolution immediately along the sun gear 55. However, at an initial stage of such rolling movement, the planetary gear 23 is guided by one of the tapered faces 56a of the disengagement preventing member 56 so that it is pulled rearwardly in the direction opposite to the direction of the arrow Y by the tapered face 56a. Consequently, the planetary gear 23 is meshed deeply and with certainty with the toothed portion 55a of the sun gear 55.

The turning member 50 and the disengagement preventing member 56 formed in an integrated relationship on the sun gear 55 constitute a transport mechanism for turning over and transporting the carriage 17 from a position at which the carriage 17 is disengaged from one of the first and second guide mechanisms to another position at which the carriage is to be engaged with the other of the first and second guide mechanisms. Meanwhile, the rack members 29 and 30 in pair described above, the sun gear 55, and the planetary gear 23, gear 27, gear mechanism 25 and motor 24 which are provided on the carriage 17 generally constitute a driving means for moving the carriage 17 on the first and second guide mechanisms and for driving the transport mechanism to turn over the carriage 17.

Figure 10:
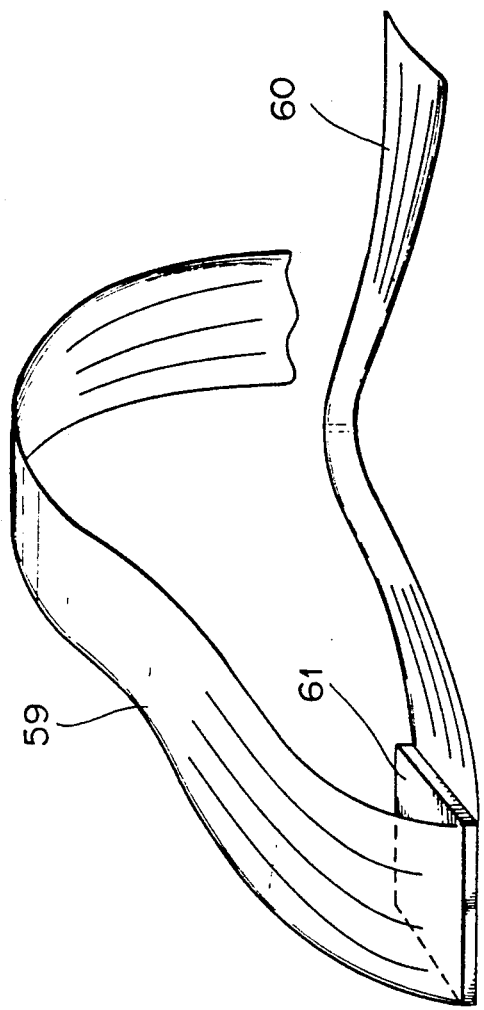
FIG. 10 is a perspective view of a flexible wiring means.

Referring to FIGS. 1, 3 and 10, a wiring means is provided for connecting the optical pickup on the carriage 17 to a power source and transmitting electric signals to and from the optical pickup. The wiring means is formed from a flexible board having a first flexible portion 59 disposed for deformation in a plane perpendicular to the axis of turning motion of the turning member 50, a second flexible portion 60 provided for deformation in a plane parallel to the axis of turning motion of the turning member 50 and connected to the optical pickup and the motor 24 on the carriage 17, and a connecting portion 61 secured to the turning member 50 for electrical connection between the first and second flexible portions 59 and 60.

When the wiring means for the optical pickup is constructed in such a manner as described above, even if the carriage 17 on which the optical pickup is carried is moved along either one of the record faces of the disk 10 and then turned over so as to subsequently read the other record face of the disk 10, the flexible board does not suffer from distortion, and the disk 10 can be played without any trouble.

A take-up and supply means is provided for taking up or supplying the second flexible portion 60 of the flexible board in response to movement of the carriage 17 along a record face of the disk 10.

Referring to FIG. 3, the take-up and supply means includes a first arm member 63 mounted like a cantilever on the turning member 50 for holding at an end portion thereof the second flexible portion 60 of the flexible board for sliding movement thereon, a second arm member 64 mounted for rocking motion between a take-up position and a supply position at an end portion of the first arm member 63 by means of a pin 64a for holding at a free end portion thereof the second flexible portion 60 for sliding movement thereon, and a spring member 65 serving as a biasing means for biasing the second arm member 64 toward its take-up position. It is to be noted that the position of the second arm member 64 indicated by solid lines in FIG. 3 makes the supply position while the position indicated by alternate long and two short dashes lines makes the take-up position.

Subsequently, a tilting means for tilting the lower chassis 5 will be described.

Referring to FIG. 3, the lower chassis 5 is supported for pivotal motion on the main chassis 70 by means of the shaft 71.

A motor 72, a worm 73 and a worm wheel 74 connected to be rotated by the motor 72, and an eccentric roller 75 integrated with the worm wheel 74 are mounted on the main chassis 70, and the lower chassis 5 is resiliently pressed at an end thereof against the eccentric roller 75 by means of a spring 76 interposed between the main chassis 70 and the lower chassis 5.

Meanwhile, an inclination angle detecting sensor not shown is provided within the carriage 17 for detecting a relative inclination angle between a record face of the disk 10 placed on the turntable 7 and the optical axis of irradiation light projected toward the record face.

The inclination angle detecting sensor may include a light source and a light receiving element both provided on the carriage 17 as disclosed, for example, in U.S. Pat. No. 4,634,853.

A signal of an inclination angle developed from the inclination angle detecting sensor is transmitted to a control circuit, and the control circuit controls the motor 72 to rotate in response to the signal received.

Upon rotation of the motor 72, the eccentric roller 75 is rotated to either push up the lower chassis 5 or to allow the lower chassis 5 to be lowered by the biasing force of the spring 76. Consequently, the lower chassis 5 is rocked around the shaft 71.

Since the lower chassis 5 and the upper chassis 6 are integrated with each other as described hereinabove, whether the carriage 17 is positioned on either one of the first and second guide members 14 and 15 of the lower chassis 5 and the upper chassis 6, the optical axis of the optical pickup and the record face of the disk 10 are adjusted such that they may make a right angle relative to each other.

On the other hand, where the distance from the spindle motor 77 to the shaft 71 is selected suitably, the distance from the optical pickup to a record face of the disk 10 can be fixed.

Figure 11:
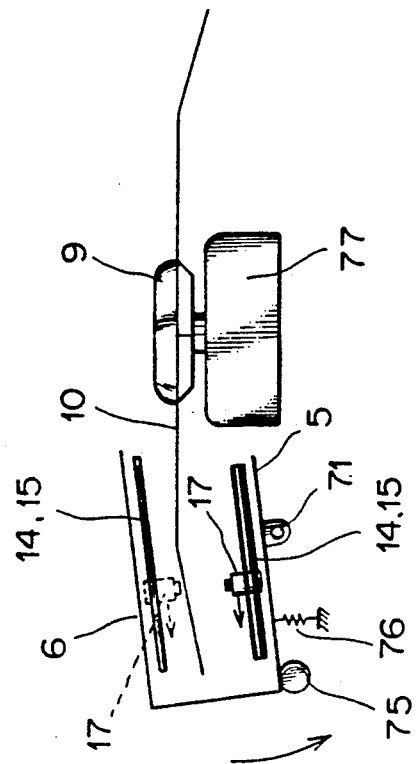
FIG. 11 is a side elevational view illustrating the principle of the present invention.

Referring to FIG. 11, full lines of the carriage 17 indicate the carriage 17 positioned on the side of the lower chassis 5 while broken lines indicate the carriage 17 positioned on the side of the upper chassis 6.

Subsequently, operation of the double-sided reproducing disk player having such a construction as described above will be described in outline.

After the gear 27 is rolled on the rack member 30 so that the carriage 17 is moved from the inner circumference side to the outer circumference side of the disk 10 to complete reproduction of the lower side record face of the disk 10, the carriage 17 is further moved outwardly so that it is soon transferred from the second guide member 15 and the linear guide projection 43 of the lower chassis 5 to the holding member 47. Simultaneously, the planetary gear 23 provided on the carriage 17 is brought into meshing engagement with the toothed portion 55a of the sun gear 55. Consequently, the planetary gear 23 starts to roll on the sun gear 55. Then, the turning member 50 which carries the holding member 47 thereon is turned around the support shaft 53 on the mounting plate 52 so that the carriage 17 is turned over and positioned so as to prepare for reading of the upper record face of the disk 10 as indicated by long and two short dashes lines in FIG. 4. After such turning motion of the turning member 50, the gear 27 is brought into meshing engagement with the upper rack member 29. Consequently, as the gear 27 is rotated, the carriage 17 is transferred from the holding member 47 to the first guide member 14 and the guide rail 44. Thereafter, the disk 10 is driven to rotate in the opposite direction to the direction of rotation during reproduction of the lower record face of the disk 10 in order to start reproduction of the upper record face of the disk 10.

It is to be noted that turning over and movement of the carriage 17 from its position for preparation for reading of the upper record face of the disk 10 to the other position for preparation for reading of the lower record face of the disk 10 proceed in the process reverse to that described above.

In this manner, while the carriage 17 moves from the inner circumference side to the outer circumference side of the disk 10, the optical pickup reproduces signals of the disk 10, and thereafter the carriage 17 is turned over, it is moved along the first guide member 14 and the guide rail 44 from the outer circumference side to the inner circumference side along the upper surface of the disk 10.

Thereupon, in response to a signal of an inclination angle detected by the inclination angle detecting sensor within the carriage 17 when the carriage 17 is near the shaft 71, the control circuit controls the motor 72 to rotate the eccentric roller 75 so that the upper chassis 6 and the lower chassis 5 may be made horizontal, that is, parallel to the plane of the turntable 7 to prevent the optical pickup from approaching a surface of the disk 10.

Similar operation is performed also when the carriage 17 returns from the side of the upper face to the other side of the lower face of the disk 10.

Having now fully described the invention, it will be apparent to one of ordinary skill in the art that many changes and modifications can be made thereto without departing from the spirit and scope of the invention as set forth herein.

What is claimed is:

1. A double-sided reproducing disk player, comprising:
    a stationary frame,
    means on said stationary frame for receiving and driving a disk to rotate around an axis thereof,
    a carriage having thereon an optical pickup for optically reading a signal of the disk,
    an upper face guide means for guiding said carriage along an upper surface of the disk,
    a lower face guide means for guiding said carriage along a lower surface of the disk,
    a transport means for transporting said carriage between said upper face guide means and said lower face guide means,
    a carrying means on which said upper and lower face guide means and transport means are carried,
    a driving means for moving said carriage on said upper and lower face guide means along a carriage axis,
    a support means for supporting said carrying means for tilting motion around a fixed axis on said stationary frame,
    a turning-over means for pivoting said carriage about said carriage axis to reverse the position of said optical pickup from a position focusing on one surface of said disk to a position focusing on the other surface of said disk, and
    a tilt angle adjusting means for adjusting a tilt angle of said carrying means with respect to said stationary frame, wherein said turning-over means, said upper face guide means, and said lower face guide means are tilted simultaneously by said tilt angle adjusting means.

2. A double-sided reproducing disk player as claimed in claim 1, wherein the tilt angle of said carrying means is adjusted such that an optical axis of said optical pickup of said carriage forms right angle with respect to the plane of the disk.

3. A double-sided reproducing disk player as claimed in claim 1, wherein at least one of said upper and lower face guide means is mounted so as to be adjustable with respect to said carrying means and to the other of said upper and lower face guide means.

4. A double-sided reproducing disk player as claimed in claim 1, wherein said fixed axis lies in a plane perpendicular to the plane of the disk and to a passage of said carriage along said upper or lower guide means.

5. A double-sided reproducing disk player as claimed in claim 1, wherein said tilt angle adjusting means is mounted on said stationary frame for cooperation with said carrying means.

6. A double-sided reproducing disk player as claimed in claim 5, wherein said tilt angle adjusting means includes an eccentric element mounted on said stationary frame for angular rotation around another fixed axis parallel to the fixed axis on said stationary frame for said carrying means, and a spring means for resiliently biasing said carrying means into cooperation with said eccentric element.

7. A double-sided reproducing disk player as claimed in claim 6, wherein said tilt angle adjusting means further includes a motor mounted on said stationary frame and connected to rotate said eccentric element.

8. A double-sided reproducing disk player as claimed in claim 7, wherein said motor is rendered operative, when said carriage passes a location adjacent said support means, to rotate said eccentric element to adjust the tilt angle of said carrying means.

9. A double-sided reproducing disk player as claimed in claim 6, wherein said eccentric element is disposed adjacent said transport means, and said spring means is a compression coil spring interposed between said stationary frame and said carrying means and located remote from said eccentric element with respect to said support means.

* * * * *